March 16, 1926.
C. E. BRIDGES
1,577,243
AUTOMATIC AIR GAUGE
Filed March 10, 1925
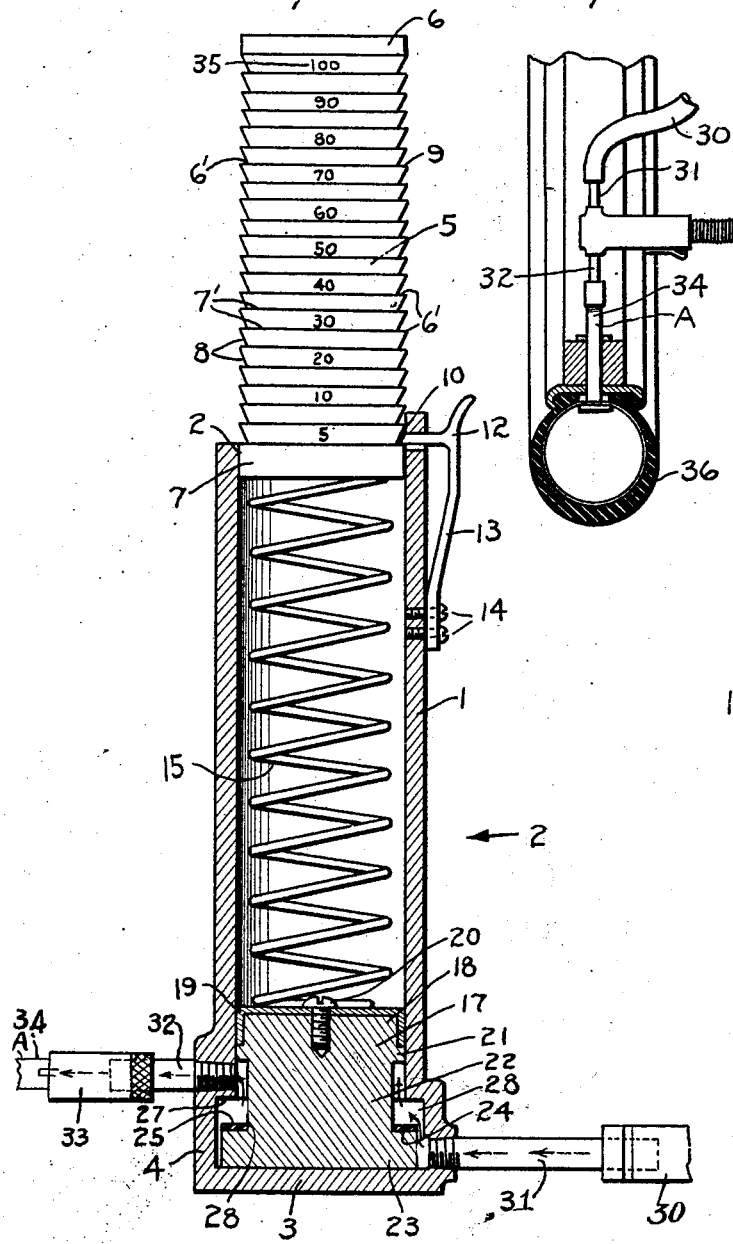
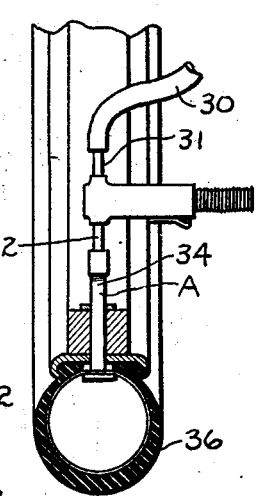
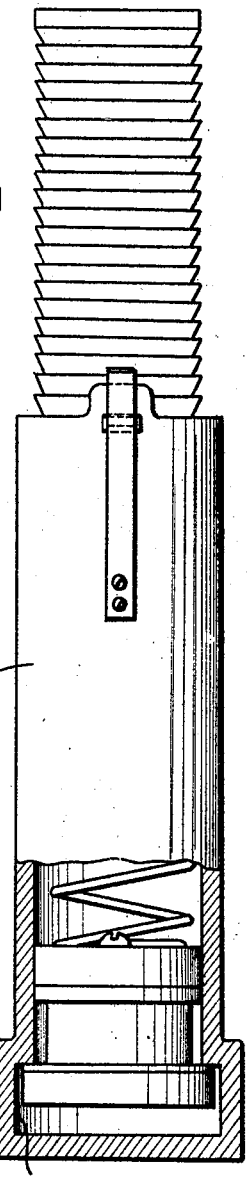
Inventor
C.E. Bridges
by Hazard and Miller
Attys.

Patented Mar. 16, 1926.

1,577,243

UNITED STATES PATENT OFFICE.

CHARLES E. BRIDGES, OF LONG BEACH, CALIFORNIA.

AUTOMATIC AIR GAUGE.

Application filed March 10, 1925. Serial No. 14,460.

*To all whom it may concern:*

Be it known that I, CHARLES E. BRIDGES, a citizen of the United States, residing at Long Beach, in the county of Los Angeles and State of California, have invented new and useful Improvements in Automatic Air Gauges, of which the following is a specification.

This invention relates to automatic air gauges.

An object of the invention is to provide an automatic air gauge adapted to be interposed between a source of compressed air and a pneumatic tire for the purpose of regulating the air pressure to which the tire is subjected.

A further object is to provide in an automatic air gauge of the type described a plunger adapted to be adjusted to any one of a given number of positions to predetermine and automatically control the air pressure permitted to escape into a pneumatic tire.

Other objects and advantages will be made manifest in the following specification of an embodiment of the invention illustrated in the accompanying drawing, in which:

Figure 1 is an enlarged vertical sectional view of the automatic air gauge.

Figure 2 is a vertical view of the air gauge taken in the direction of the arrow 2 of Figure 1, with parts cut away to illustrate the operation of the gauge.

Figure 3 is a diminished view, partly in section, of the automatic air gauge in its working relation with a pneumatic tire.

The details of construction and operation of the invention are as follows:

A cylindrical body 1 open at its upper end 2 and provided with a bottom 3 is formed with a suitable enlargement 4 adjacent the lower end for a purpose hereinafter described.

Adapted to reciprocate within the cylindrical body is a plunger 5 formed with cylindrical ends 6 and 7 adapted to slidably engage the inner walls of the cylindrical body 1. The body of the plunger is formed with a plurality of annular grooves 6', these grooves being cut with faces 7' in a plane transversely of the vertical axis of the plunger. Conical faces 8 extend inwardly from the peripheries of the faces 7', thus forming a plurality of notches 9 extending around the peripheral surface of the plunger 5.

The cylindrical body is provided with an elongation 10 through which an aperture extends for the accommodation of a dog 12 which has a spring body 13 and is secured to the exterior of the cylindrical body 1 by screws 14. The dog 12 is adapted to engage any one of the notches 9.

A coil expansion spring 15 is disposed within the cylindrical body, bearing at one end upon the cylindrical portion 7 of the plunger 5 and at the other end upon a piston 17 hereinafter described. The piston consists of a block of the cross section illustrated in Figure 1, having a cylindrical portion 18 less than the interior of the diameter of the cylindrical body 1. Interposed between the cylindrical portion 18 and the cylindrical body 1 is a leather cup washer 19 secured to the piston 17 by a screw 20. An annular ring 21 is a part of the piston 17 and is adapted to snugly engage the wall of the cylindrical body 1. Below the ring 21 the piston has a reduced portion 22 and is enlarged again at 23, thus forming an annular shoulder 24 upon which is placed a leather or rubber washer 25.

It will be observed that the exterior of the enlargement 23 of the piston 17 is less than the interior diameter of the enlargement 4 of the cylindrical body 1, thus providing space in which air may pass. The enlarging of the cylindrical body 1 provides an annular shoulder 27 against which the washer 25 may press when the piston 17 is in a raised position, and when the piston 17 is in a lowered position a chamber 28 is formed.

An air hose 30 carrying air under pressure from a compressor not herein shown is joined to a nipple 31 which is tapped into cylindrical body 1 adjacent the bottom and communicates with the chamber 28.

A nipple 32 is tapped into the cylindrical body 1 on the side opposite the nipple 31 above the annular shoulder 27. Upon the outer end of the nipple is a standard check tire valve 33 which is adapted to couple with a valve stem 34 of a pneumatic tire.

A scale 35 designating the pound pressure controlled by each notch 9 is properly placed on the plunger 5. It is obvious that the scale 35 must be computed with reference to the determined tension of the spring 15.

In the use of the invention the plunger 5 is adjusted so that the number of pounds pressure it is desired to inject into a tire 36 appears by the scale adjacent the dog 12 and the spring action of the spring body 13 will tend to hold the dog in engagement with the notch 9 against the pressure of the coil spring 15. The standard check tire valve 33 is then coupled with the valve stem 34 of the tire 36. The piston 17 is normally retained in its upper position as indicated in Figure 2 by air pressure from the hose on the lower end 24 of piston 17, and if the pressure in the tire 36 be less than the predetermined pressure indicated by the scale the air pressure in the lower part of the chamber 28 will by communication with the tire be less than the pressure of the spring 15 which will immediately press the piston 17 downwardly until it rests on the bottom 3 whereupon compressed air from the hose 30 will enter the chamber 28 and encircling the piston 17 will be discharged through the nipple 32 and the standard check tire valve 33 into the tire 36. When the pressure within the tire 36 becomes equal to the predetermined pressure exerted by the spring 15 upon the piston 17 the reaction of the air pressure from the tire will cause the piston 17 to rise until the washer 25 is compressed against the annular shoulder 27 of the cylindrical body 1, thus preventing further discharge of compressed air into the tire 36. It will be apparent that the check tire valve 33 will retain pressure within the nipple 32 and the lower part of the chamber 28 so that as long as the air pressure in the lower part of the chamber 28 is equal to the pressure exerted by the spring 15 the entrance of compressed air through the hose 30 into the upper part of the chamber 28 will have no effect on the movement of the piston 17.

It is obvious that the air pressure from the hose 31 will automatically raise the piston 17 to its upper position when the check tire valve 33 is closed, a seal between the piston and the cylindrical body 1 being effected by the leather cup washer 19.

Various changes may be made without departing from the spirit of the invention as claimed.

What is claimed is:

1. An automatic air gauge for inflating pneumatic tires, comprising an elongated cylinder having an internal bore, a recess of larger diameter than the bore formed in one end thereof, an air inlet in the base of the recess, an air outlet in the lower end of the cylinder above the recess, a piston having a pair of heads, one of said heads being larger than the other, with the larger head within the recess and the smaller head within the bore of the cylinder, a plunger having a plurality of annular grooves slidably mounted in the bore of the cylinder, an expansion spring between said plunger and piston and a dog formed of spring material having one end secured to the cylinder and the other end adapted to engage the annular groove in said plunger.

2. An automatic air gauge adapted to be interposed between a source of compressed air and a tire valve comprising an elongated cylinder having a bore and an internal annular recess formed at the lower end thereof, an air inlet entering the recess at the lower end, an air outlet formed in the lower end of the bore above the recess, a piston having a head slidable in the bore of the said cylinder and a second head of larger diameter than the first head but of smaller diameter than the internal recess, adapted to normally rest on the bottom of the recess, the said piston having an annular space between the said heads, a plunger having a plurality of annular grooves slidably mounted in the bore of the cylinder, an expansion coil spring within the bore of the cylinder between the plunger and the piston, a dog formed of spring material adapted to engage the annular grooves in the said plunger and retain the plunger in predetermined position, the said piston being adapted to be raised when the air pressure in the tire is sufficient to overcome the tension of the said spring and the large head of the piston being adapted to engage the upper face of the recess and cut off the air entering through the inlet.

In testimony whereof I have signed my name to this specification.

CHARLES E. BRIDGES.